United States Patent [19]

Teshima et al.

[11] Patent Number: 5,744,882
[45] Date of Patent: Apr. 28, 1998

[54] SPINDLE MOTOR

[75] Inventors: Hiroyoshi Teshima, Sumiyoshi; Akihide Matsuo, Yonago, both of Japan

[73] Assignee: Matsushita Electric Industrial Co., Ltd., Japan

[21] Appl. No.: 655,383

[22] Filed: May 30, 1996

[30] Foreign Application Priority Data

Jun. 7, 1995 [JP] Japan .................................. 7-139778

[51] Int. Cl.⁶ .................................................. H02K 7/14
[52] U.S. Cl. ...................... 310/67 R; 310/90; 310/89; 360/99.12; 360/99.05
[58] Field of Search ............................ 310/67 R, 90, 310/89; 360/99.12, 99.05, 98.08

[56] References Cited

U.S. PATENT DOCUMENTS

| 3,938,192 | 2/1976 | Caletti | 360/133 |
| 5,317,225 | 5/1994 | Miyaji | 310/67 R |
| 5,376,850 | 12/1994 | Elsing et al. | 310/67 R |
| 5,400,197 | 3/1995 | Jabbari et al. | 360/99.08 |

FOREIGN PATENT DOCUMENTS

| 62-90044 | 4/1987 | Japan . |
| 62-94838 | 4/1987 | Japan . |
| 1-292860 | 11/1989 | Japan . |
| 2-231834 | 9/1990 | Japan . |
| 2-231835 | 9/1990 | Japan . |
| 2-416184 | 12/1990 | Japan . |
| 3-223291 | 8/1991 | Japan . |

*Primary Examiner*—Steven L. Stephan
*Assistant Examiner*—Timothy A. Williams
*Attorney, Agent, or Firm*—Parkhurst & Wendel

[57] ABSTRACT

A spindle motor has a tapped hole formed in the end surface of a rotor hub at the center of rotation of the rotor hub. A clamping member presses a disk against a disk holding surface of the rotor hub by a clamp screw threaded in the tapped hole. Since the disk is clamped through a clamping member by threading and tightening one clamp screw, the clamping operation is efficiently carried out and disk imbalance due to the clamping clamp screw is decreased.

4 Claims, 5 Drawing Sheets

PRIOR ART

SPINDLE MOTOR

FIELD OF THE INVENTION

The present invention relates to a spindle motor used, for example, for an optical disk drive or a magnetic disk drive, and in particular to a spindle motor suitable for driving a disk having diameters of 3.5 inches, 1.8 inches or less.

BACKGROUND OF THE INVENTION

Presently, optical disk drives and magnetic disk drives are becoming smaller in size, lighter in weight, and larger in disk capacity. As notebook size personal computers are increasingly used, spindle motors must handle smaller and thinner disks, and is necessary to be improved for shock resistance and precision.

Conventionally, a small ball bearing has been employed as a bearing for a spindle motor. A spindle motor for HDD (hard disk driver) has a cup-shaped rotor hub mounted on a shaft which is supported through a ball bearing. Placed on a collar-shaped disk receiving surface formed on a cylindrical section of the rotor hub is a magnetic disk which is in turn pressed against the disk receiving surface by a clamping member abutting against the end surface of the rotor hub, and clamped on the rotor hub. The clamping member is mounted on the rotor hub by clamp screws which are threaded over the outer periphery of the end surface of the rotor hub.

In such a clamping approach in which the clamping member is threaded over the rotor hub, readjustment is frequently required, leading to poor working efficiency, and causing significant problems in streamlining assembly.

Readjustment becomes required because the magnetic disk is warped if there is variation in tightening force of each clamp screw. In addition, since threads are provided near the outer periphery of the rotor hub, the rotor hub may be deformed when the clamp screws are tightened so that defects tend to easily occur in a step where ambient temperature is changed during a heat-run step during HDD inspection. Furthermore, since the clamp screws are positioned at a position close to the distance between the center of rotation and the inner diameter of the magnetic disk, imbalance easily occurs.

In some cases, a spindle motor utilizing a fluid dynamic pressure bearing in which lubricant is filled has been developed. However, in the spindle motor using the fluid dynamic pressure bearing, the bearing rigidity is smaller than that of the ball bearing so that amount of imbalance should be further reduced to reduce the amount of imbalance, which further worsens the working efficiency.

DISCLOSURE OF THE INVENTION

In view of the conventional problems described above, the present invention is intended to provide a spindle motor having less imbalance when the disk is clamped by the clamping member, provide better working efficiency during assembly, and enable streamlining of the assembly process.

The spindle motor according to the present invention comprises a rotor hub on which a disk is clamped, the rotor hub being rotatably supported relative to a housing, the rotor hub being driven for rotation by magnetic repulsion action between the housing and the rotor hub, wherein a tapped hole is formed in the end surface of the rotor hub at the center of rotation of the rotor hub, a clamping member which presses the disk against a disk holding surface of the rotor hub being mounted on the rotor hub by a clamp screw threaded in the tapped hole.

With such an arrangement, since the disk is clamped through a clamping member by threading and tightening one clamp screw into the tapped hole formed in the end surface of the shaft, the clamping operation can be efficiently carried out and imbalance hardly occurs as a result of the clamp screw while clamping so that the clamping operation can be streamlined.

In addition, when clamping is performed with one clamp screw, and the clamp screw is tightened into the tapped hole in the end surface of the shaft, the shaft may be loosened from the hub unless the fixing strength between the shaft and the rotor hub is increased. However, when the rotor hub is welded to the shaft for fixing, the shaft does not loosen while tightening the clamp screw even if a fitting width between the rotor hub and the shaft is narrowed so that the shaft can be stably secured.

Furthermore, when a recessed step is formed in the rotor hub, and the outer periphery of the shaft is welded to a corner on the bottom of the recessed step, the welding forms a fillet weld so that the welded portion is stable, less sputter is caused, and variation of strength can be reduced.

Furthermore, when a projection with a diameter smaller than the diameter of the shaft is formed where the end surface of the shaft engages the rotor hub, it is possible to prevent the shaft from loosening out when tightening the clamp without the welding process so that the shaft can be stably secured.

Furthermore, when the projection is constituted by a material separate from the rotor hub, it is possible to prevent the shaft from loosening out when tightening the clamp with simple processing so that the shaft can be stably secured.

DESCRIPTION OF THE EMBODIMENTS

Now, embodiments of the present invention will be explained with reference to FIGS. 1–8.

Figure 9:
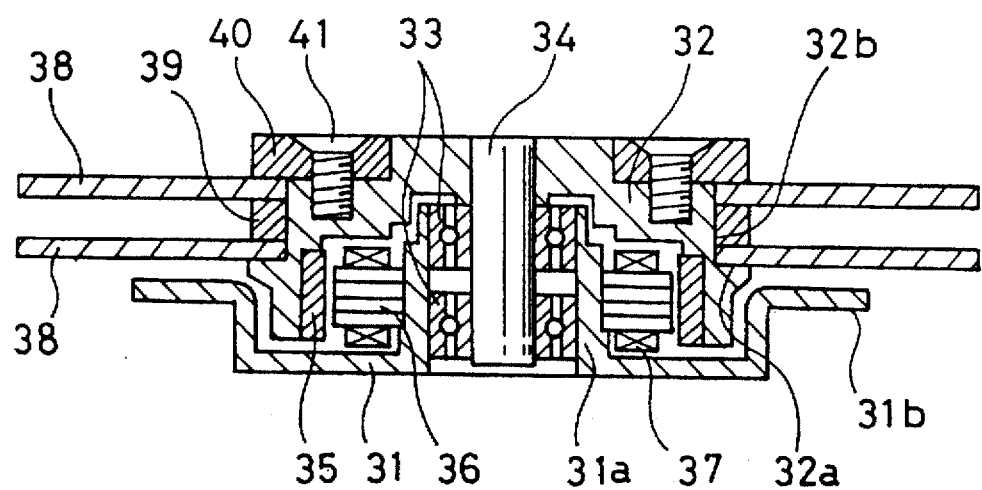
FIG. 9 is a sectional view of a conventional spindle motor.

To make the objects of the present invention clear, description is first given with reference to FIG. 9.

A conventional spindle motor is arranged as shown in FIG. 9.

A housing 31 of the motor has an inner periphery formed into a cylindrical section 31a and an outer periphery having a flange 31b. Fixed inside the cylindrical section 31a are a pair of ball bearings 33 through which a shaft 34 is rotatably supported.

A rotor hub 32 is secured on one end of the shaft 34. The cylindrical section 31a has a stator core 36 secured on its outer periphery around which a coil 37 is wound. The rotor hub 32 is formed into a cup shape which is formed with a disk receiving surface 32a and a cylindrical section 32b for limiting the inner diameter of a disk.

A cylindrical magnet 35 alternately magnetized with N and S poles in its circumferential direction is secured on the inner surface of the cylindrical section of the cup-shaped rotor hub 32 at a position opposite the stator core 36. Disks 38 are placed on the disk receiving surface 32a of the rotor hub 32 in a state where they are separated and held by a spacer 39 with a predetermined distance. A clamping member 40 is positioned on the disk.

The clamping member 40 is secured to the rotor hub 32 by clamp screws 41 so that the disks 38 are clamped between the disk receiving surface 32a and the clamping member 40 by the fastening force of the screws.

In a clamping system in which the clamping member 40 is thread fastened against the rotor hub 32 as in the spindle motor shown in FIG. 9, readjustment is often required.

The first reason why the readjustment is required lies in the fact that, since there are a number of clamp screws 41, and the disk 38 may be warped if there is variation in fastening force of clamp screws 41 in fastening the disk 38, it is necessary to first temporarily fasten all screws, and then finally fasten them with a predetermined fastening torque. If there is insufficient fastening force coordination between each screw, readjustment of the screws becomes necessary.

The second reason why readjustment is required lies in the fact that the threads are provided near the outer periphery of the rotor hub 32, and when clamping is carried out by fastening the clamp screws 41, the cylindrical section 32b for limiting the inner diameter is deformed to thus increase the diameter, thereby resulting in force acting on the inner end of the disk 38 so that undesirable defects tend to occur during HDD inspection where ambient temperature is changed, for example, during heat-run cycling. If a fitting gap is increased between the rotor hub 32 and the disk 38 as a consequence of such a situation, imbalance easily occurs. Thus, increase in the fitting gap should be avoided, and any defective product caused in the process must be reworked by resetting the disks 38.

Finally, the third reason why readjustment is required lies in the fact that, since the clamp screws 41 are positioned at a position close to the distance between the center of rotation and the inner diameter of the disk 38, unbalance easily occurs. For a product with insufficient balance adjustment, clamping should be released, and then carried out again after adjustment to reduce eccentricity of the center of rotation of the disk 38.

Thus, because two fastening steps, i.e., temporary fastening of all clamp screws 41 and final fastening with the predetermined clamping torque, are necessary, work efficiency is poor, and assembly is hardly streamlined.

Furthermore, there is another problem that, when clamping causes warping of the disk 38, imbalance, or defects during the heat-run cycling process, it is necessary to perform the clamping operation again, and many clamp screws are used, whereby the work efficiency is further worsened.

In addition, in the spindle motor as described above, when a small ball bearing is used as its diameter is reduced, it is difficult to attain high capacity because sufficient rotation accuracy cannot be obtained. Shock resistance is extremely reduced so that the ball bearing is deteriorated thereby causing a noise problem. To cope with such circumstances, a spindle motor utilizing a fluid dynamic pressure bearing in which lubricant is filled has been developed. However, in the spindle motor using the fluid dynamic pressure bearing, the bearing rigidity is smaller than that of the ball bearing so that the amount of imbalance should be further reduced to reduce the amount of imbalance, which further worsen the working efficiency.

In addition, in a case of a small HDD, the threaded section provided in the rotor hub 32 occupies a relatively large space so that the magnet cannot be increased in its size, which imposes a large cost on motor performance.

In contrast to the above, the spindle motor according to the present invention is arranged as shown in FIGS. 1–8.

FIRST EMBODIMENT

Figure 1:
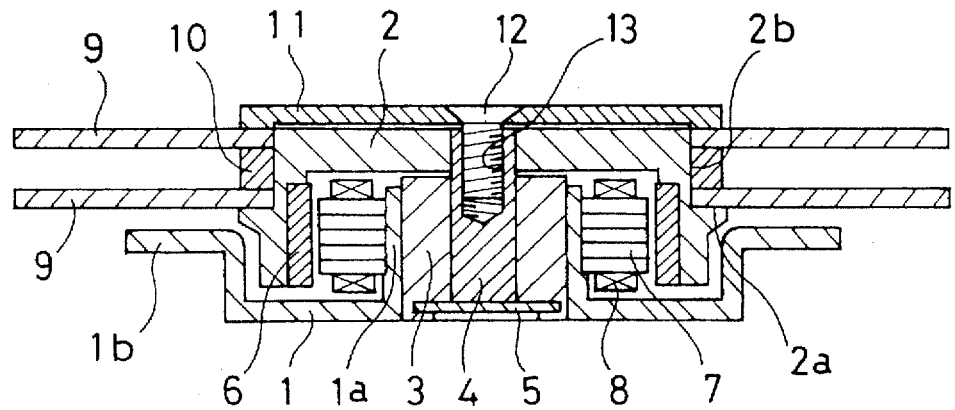
FIG. 1 is a sectional view of a first embodiment of the spindle motor according to the present invention.
Figure 2:
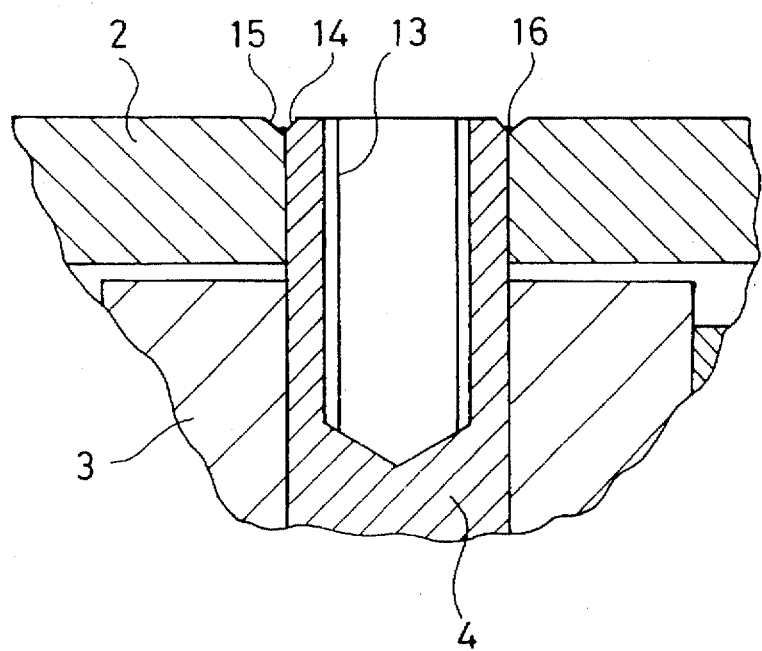
FIG. 2 is a partial enlarged sectional view of the fixing area between a rotor hub and a shaft of the embodiment.

FIGS. 1 and 2 show the first embodiment.

FIG. 1 shows a spindle motor for a HDD utilizing a fluid dynamic pressure bearing. It comprises a motor housing 1, a rotor hub 2, a sleeve 3, a shaft 4, and a thrust plate 5. It also comprises a magnet 6 secured on the rotor hub 2, a stator core 7, and a coil 8. It further comprises disks 9, a spacer 10, a clamping member 11, and a clamp screw 12.

The motor housing 1 has an inner periphery formed into a cylindrical section 1a and an outer periphery having a flange 1b. The sleeve 3 is mounted on the inner surface of the cylindrical section 1a of the housing 1. The outer periphery of the flange 1b is mounted on a chassis of the HDD.

Fixed on the outer peripheral surface of the cylindrical section 1a is a stator core 7 around which the coil 8 is wound. The rotor hub 2 is formed into a cup shape which is formed with a disk receiving surface 2a and a cylindrical section 2b for limiting the inner diameter of a disk. The rotor hub 2 rotates around the shaft 4 secured at its center. A cylindrical magnet 6 alternately magnetized with N and S poles in its circumferential direction is secured on the inner surface of the cylindrical section of the cup-shaped rotor hub 2.

When current is supplied to the coil 8, a magnetic field is generated around the salient-pole of the stator core 7, causing torque between the stator core 7 and the field magnet 6 opposite to it thereby rotate the rotor hub 2 and thus the disks 9 clamped on the rotor hub 2.

The thrust plate 5 is secured with calking on the lower end of the sleeve 3 secured on the cylindrical section 1a inside the housing 1, and is filled with lubricating oil as a fluid material. The thrust plate 5 is formed with a spiral dynamic pressure bearing groove, and is rotatably supported in the thrust direction by the dynamic pressure which is generated on the thrust plate 5 and the end surface of the shaft 4 as the shaft 4 rotates. The shaft 4 is also rotatably supported in non-contact manner with the sleeve 3 in the radial direction by the dynamic pressure generated in the lubricating oil.

FIG. 1 shows a state where two disks 9 are mounted on the rotor hub 2. The disks 9, 9 are mounted on the disk receiving surface 2a separated by the spacer 10 with a predetermined distance, and the clamping member 11 is placed on the upper disk 9.

The clamping member 11 is fastened by the clamp screw 12 threaded in a tapped hole 13 provided in the end surface of the shaft 4. Its fastening force flexes the central portion of the clamping member 11 and reaction force of the flexure of which clamps the inner periphery of the disk 9.

Thus, since the disks 9 can be clamped on the rotor hub 2 through the clamping member 11 by threading one clamp screw 12 in the tapped hole 13 provided in the end surface of the shaft 4 for fastening, the clamping operation can be efficiently performed. In addition, since clamping is carried out by one clamp screw 12, it is possible to the reduce amount of imbalance.

Furthermore, the rotor hub 2 is laser welded to the shaft 4. As shown in FIG. 2, the top surface of the rotor hub 2 is arranged to be flush with the end surface of the shaft 4, the outer peripheral edge of the shaft 4 is rounded at 14, and the inner peripheral edge of the rotor hub 2 is chamfered at 15. The rotor hub 2 and the shaft 4 are laser welded by projecting a laser beam onto the recess formed by the rounded section 14 and the chamfered section 15. Numeral 16 indicates the welded section.

As described, since the shaft 4 is press fitted into and laser welded to the rotor hub 2 so that securing strength is enhanced between the rotor hub 2 and the shaft 4 through combination of press fitting and laser welding, there is no possibility of movement of the shaft 4 relative to the rotor hub 2 in the thrust direction even if the clamping force to the disk 9 acts on the shaft 4 through the clamp screw 12. The clamping force can be sufficiently supported even if the fitting width is reduced between the rotor hub 2 and the shaft 4. Since the width of fixed portion of the rotor hub 2 and the shaft 4 can be narrowed, the bearing span for the fluid dynamic pressure bearing can be increased by such amount so that a small spindle motor and improved bearing performance can be attained.

SECOND EMBODIMENT

Figure 3:
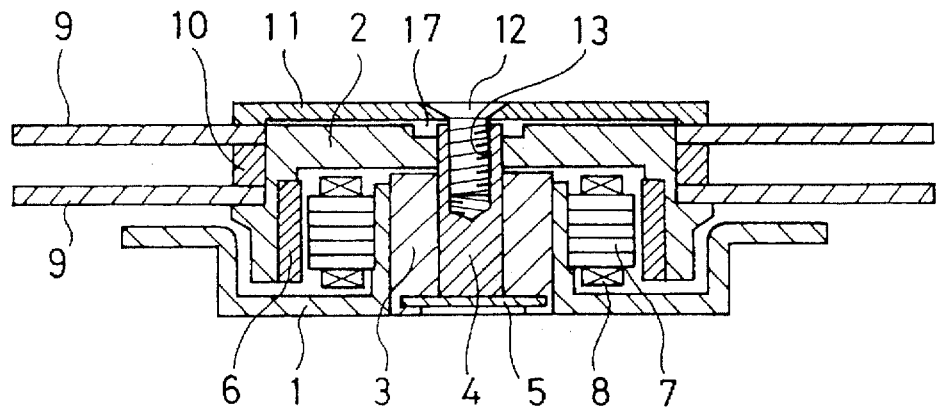
FIG. 3 is a sectional view of a second embodiment of the spindle motor according to the present invention.
Figure 4:
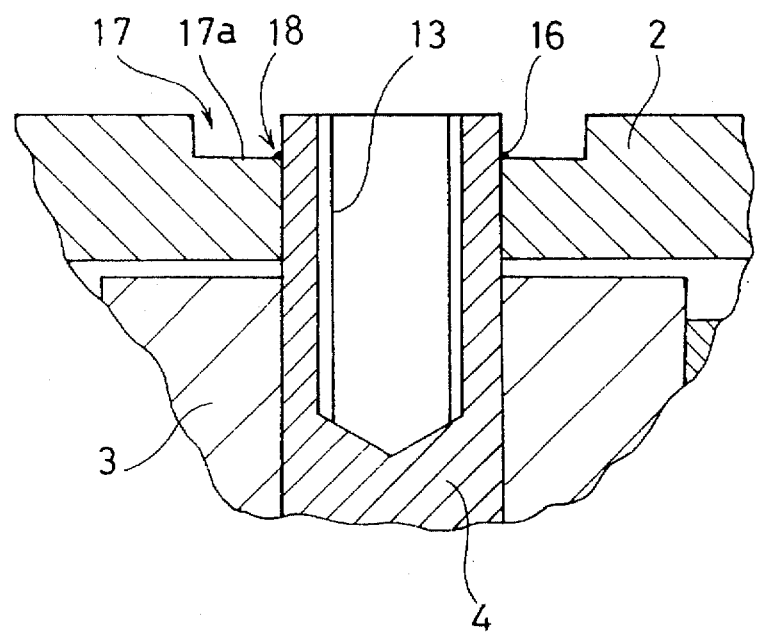
FIG. 4 is a partial enlarged sectional view of the fixing area between a rotor hub and a shaft of the embodiment.

FIGS. 3 and 4 show the second embodiment. The same components as those in the first embodiment described above are referenced by the same references to omit their detailed description, and only differences are described.

The spindle motor shown in FIG. 3 is, as shown in detail in FIG. 4, formed with a recessed step 17 larger than the diameter of the shaft 4 in the end surface of the rotor hub 2 at the center of rotation. The outer periphery of the upper end of the press fitted shaft 4 is laser welded to the bottom 17a of the recessed step 17 at a corner 18.

As described, since the shaft 4 is press fitted into the rotor hub 2, the upper end of the shaft 4 is caused to project from the recessed step 17, and the rotor hub 2 and the shaft 4 are laser welded by projecting a laser beam onto the corner 18 between the outer periphery of the projected shaft 4 and the bottom of the recessed step 17, securing strength can be enhanced between the rotor hub 2 and the shaft 4 so that the clamping force by the clamping member 11 can be sufficiently supported even if the fitting width is narrowed between the rotor hub 2 and the shaft 4. Since the recessed step 17 is provided in the rotor hub 2, the laser beam is projected onto the corner 18 for welding so that welding can be stabilized, the amount of sputter can be reduced, and variation in strength can be reduced.

THIRD EMBODIMENT

Figure 5:
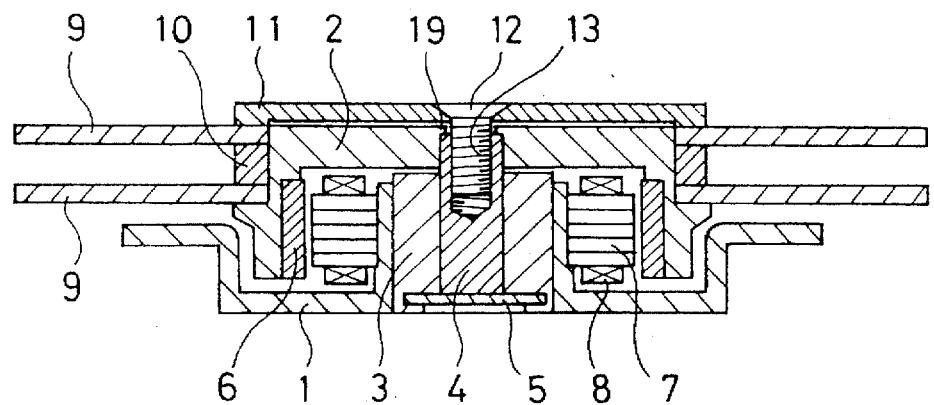
FIG. 5 is a sectional view of a third embodiment of the spindle motor according to the present invention.
Figure 6:
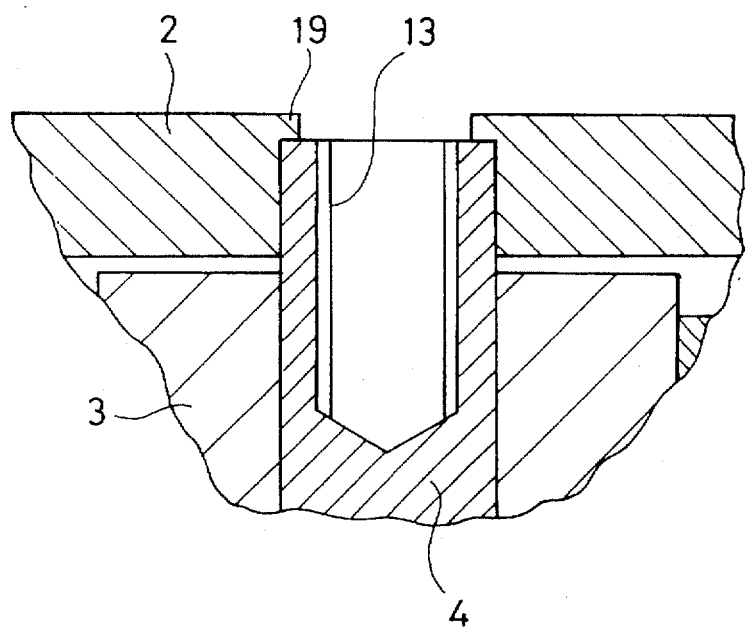
FIG. 6 is a partial enlarged sectional view of the fixing area between a rotor hub and a shaft of the embodiment.

FIGS. 5 and 6 show a third embodiment of the invention. The same components as those in the first embodiment described above are referenced by the same references to omit their detailed description, and only differences are described.

The spindle motor shown in FIG. 5 is, as shown in detail in FIG. 6, formed at the center of rotation of the rotor hub 2 with a large-diameter hole 2c into which the shaft 4 is press fitted, and a projection 19 positioned at the end of the large diameter hole 2c and which abuts against the end of the press-fitted shaft 4.

As the outer periphery of the end of the shaft 4 engages the projection 19 from the bottom, the shaft 4 can be constrained for movement in the thrust direction so that the shaft 4 does not move under fastening force when clamping the disk 9 and thus the fastening force can be increased.

Thus, the clamping force by the clamping member 11 can be sufficiently supported even if the fitting width is narrowed between the rotor hub 2 and the shaft 4. There is no possibility of loosening-out of the shaft 4 when clamping is carried out by fastening the fastening screw so that the disk 9 can be stably clamped.

FOURTH EMBODIMENT

Figure 7:
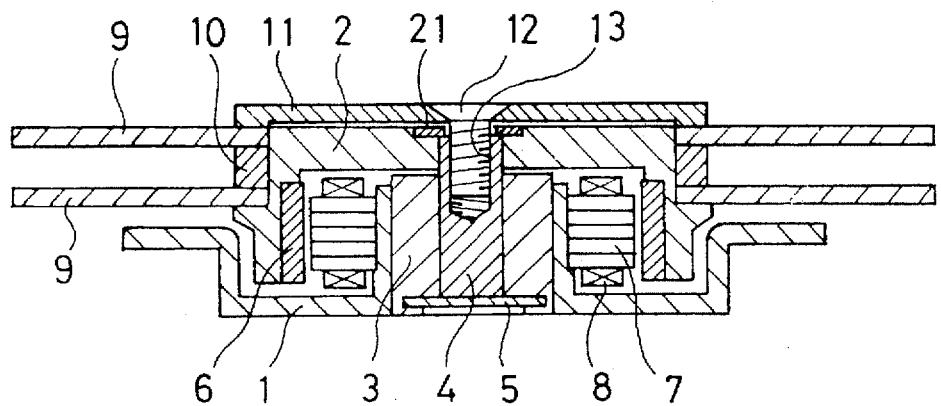
FIG. 7 is a sectional view of a fourth embodiment of the spindle motor according to the present invention.
Figure 8:
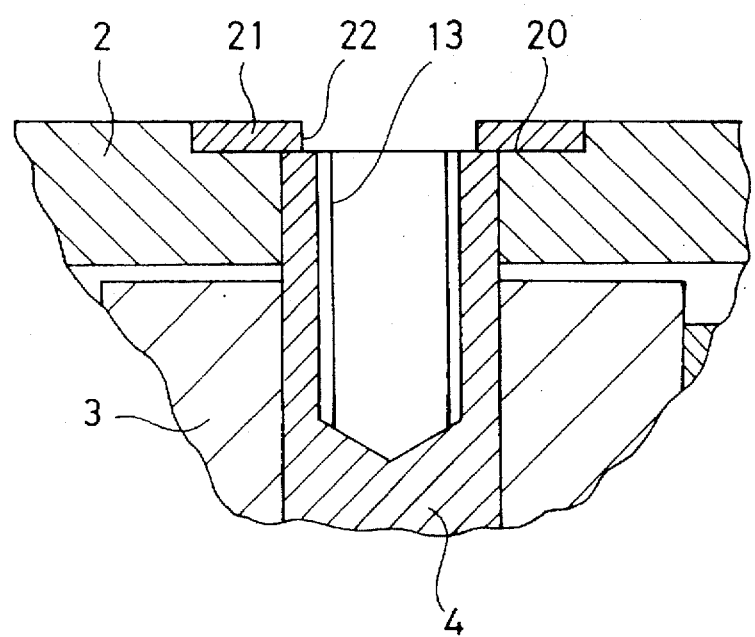
FIG. 8 is a partial enlarged sectional view of the fixing area between a rotor hub and a shaft of the embodiment.

FIGS. 7 and 8 show a fourth embodiment. The same components as those in the first embodiment described above are referenced by the same references to omit their detailed description, and only differences are described.

In the spindle motor shown in FIG. 7, as shown in detail in FIG. 8, the projection 19 of the third embodiment is constituted by a separate material. A recess 20 is formed in the top surface of the rotor hub 2 at its center. The shaft 4 is fitted into the rotor hub 2 so that its end surface is flush with the bottom plane of the recess 20. Then, a plate 21 formed with a through hole 22 at its center which is smaller than the outer diameter of the shaft 4, but through which the clamp screw 12 can pass is placed and bonded in the recess 20, and secured by screws or the like.

In this embodiment also, the clamping force by the clamping member 11 can be sufficiently supported even if the fitting width is narrowed between the rotor hub 2 and the shaft 4. There is no possibility of loosening-out of the shaft 4 when clamping is carried out by fastening the clamp screw 12 so that the disk 9 can be stably clamped.

As illustrated by the embodiments described above, since the disk is clamped through the clamping member by threading one clamp screw in the tapped hole provided in the end surface of the shaft for fastening, the clamping operation can be efficiently carried out, and streamlined. In addition, since imbalance by the clamp screw hardly occurs, the amount of imbalance can be reduced, and high rotation accuracy and life can be assured even by a fluid dynamic pressure bearing which has relatively low bearing rigidity.

In addition, when the rotor hub is welded and secured on the shaft, the shaft is not loosened out by fastening of the clamp screw even if the fitting width is narrowed between the rotor hub and the shaft so that the shaft can be stably secured. As the width of securing portion between the rotor hub and the shaft can be shortened as described, the bearing span for the fluid dynamic pressure bearing can be increased by such an amount so that a small spindle motor and improved bearing performance can be attained.

Furthermore, when a recessed step is formed in the rotor hub, and the outer periphery of the shaft is welded to the recessed step at the corner on its bottom, the welding forms fillet welds so that the welded portion is stable, less sputter is caused, and variation of strength can be reduced.

Furthermore, when a projection with smaller diameter is formed on the rotor hub for engagement with the end surface of the shaft, loosening-out of the shaft caused by fastening of the clamp screw can be prevented without welding so that the shaft can be stably secured.

Furthermore, when the projection is formed by a material other than that for the rotor hub, loosening-out of the shaft caused by fastening of the clamp screw can be prevented by a simple process so that the shaft can be stably secured.

We claim:

1. A spindle motor, comprising:

a housing having a stator;

a rotor hub, on which a disk is clamped, rotatably supported relative to said housing, and having a magnet rotatably driven by magnetic repulsion action between said stator and said magnet, said rotor hub having (i) a large-diameter hole at the center of rotation thereof through which a shaft having a tapped hole at one end thereof is press fitted, and (ii) a projection positioned at an end of said large-diameter hole abutting said end of said shaft; and a clamping member, mounted on said rotor hub by a clamp screw threaded in said tapped hole, for pressing said disk against a disk holding surface of said rotor hub, said clamping member and said rotor hub defining a gap therebetween.

2. A spindle motor, comprising:

a housing having a stator;

a rotor hub, on which a disk is clamped, rotatably supported relative to said housing, and having a magnet rotatable driven by magnetic repulsion action between said stator and said magnet;

a shaft welded and secured on said rotor hub to rotatably support said rotor hub relative to said housing through said shaft, said shaft having a tapped hole in an end surface of said shaft at the center of rotation of said shaft; and a clamping member, mounted on said rotor hub by a clamp screw threaded in said tapped hole, for pressing said disk against a disk holding surface of said rotor hub, said clamping member and said rotor hub defining a gap therebetween.

3. A spindle motor according to claim 2, further comprising a recess formed in an end surface of the rotor hub at the center of rotation of said rotor hub, said recess having a diameter larger than that of said shaft such that said shaft can be press fitted into said rotor hub, said shaft and said rotor hub being welded together at the bottom of said recess where said rotor hub abuts said shaft press fitted in said rotor hub.

4. A spindle motor according to claim 1, wherein the projection comprises a material different from that of said rotor hub.

* * * * *